United States Patent [19]

DeSisto

[11] 4,455,498
[45] Jun. 19, 1984

[54] MEANS FOR ADJUSTING MOTOR END PLAY

[76] Inventor: Richard E. DeSisto, 301 W. Ridge St., Carlisle, Pa. 17013

[21] Appl. No.: 409,766

[22] Filed: Aug. 19, 1982

Related U.S. Application Data

[63] Continuation of Ser. No. 218,395, Dec. 19, 1980.

[51] Int. Cl.³ .......................................... H02K 15/16
[52] U.S. Cl. ...................................... 310/42; 29/596; 310/90; 384/248
[58] Field of Search ................ 29/596, 598; 384/192, 384/248, 424, 427; 310/42, 90

[56] References Cited

U.S. PATENT DOCUMENTS

| | | | |
|---|---|---|---|
| 2,471,180 | 5/1949 | Wightman | 384/248 |
| 2,539,879 | 1/1951 | Wightman | 384/248 |
| 2,654,641 | 10/1953 | Veatch, Jr. et al. | 384/192 |
| 4,170,058 | 10/1979 | Leffler | 29/596 |
| 4,199,861 | 4/1980 | Buckman et al. | 29/598 |

Primary Examiner—J. D. Miller
Assistant Examiner—D. L. Rebsch

[57] ABSTRACT

Means are disclosed for adjusting motor end play such that, despite variation from motor to motor in the distance between front and rear bearings on so-called skeleton motors, the end play can in all cases be brought to a minimum predetermined value. A lockwasher is positioned on the shaft by an arbor press that is referenced to a shoulder of the stator bearing assembly, thus compensating for length variations in stator manufacture.

4 Claims, 6 Drawing Figures

MEANS FOR ADJUSTING MOTOR END PLAY

This application is a continuation of application Ser. No. 218,395, filed 12/19/80.

BACKGROUND OF THE INVENTION

1. Field of the Invention.

The present invention pertains to electrical motors and more particularly, relates to solving the problem of end play variation occurring in a variety of motors when the tolerances involved for individual parts accumulate such that there is great difficulty in insuring that the end or axial play of the rotor will be kept to a minimum.

Although a certain degree of end play is normally permissible in the fabrication of a variety of electrical motors, one wants to insure that such axial movement will be minimized. Specifically, the present invention is particularly concerned with the problem of end play variation as it occurs in certain small so-called skeleton motors typically used for driving fans or brushes or the like.

Essentially, the above-described end play problem arises because of the fact that the distance between the front and rear bearings on such skeleton motors is determined mostly by the stack heights of the stator. The stator, in turn, can vary in its length by as much as plus or minus 0.040 inches in typical cases. When the accumulated tolerance of the various brackets used for mounting the bearings is taken into account, the distance between bearings can vary on some motors by as much as plus or minus 0.060 inches. Now, since the armature is mounted between these bearings, unless some arrangements are provided to adjust or compensate for this tolerance, the brushes could run over the commutator or into the welded connections thereof. In addition, the armature laminations would move out of alignment with stator laminations.

2. Background Art

In order to provide some background information for the disclosure of the present invention, reference may be made to U.S. Pat. No. 4,170,058 in which a particular method of adjusting end play is described. However, the method of that patent involves relative axial positioning between a bearing and one of the rotor and stator.

In contrast, the present invention provides an arrangement which does not involve displacement of a bearing. Instead, a totally different means is adopted to solve the problem of overcoming accumulated tolerance.

Accordingly, it is a primary object of the present invention to provide for adjustment of end play so as to compensate selectively for the variations that occur from one motor to another in the distance between their front and rear bearings, due to the variable accumulated tolerance which defines or determines the distance.

Another object is to provide an extremely simple means disposed around the shaft of the rotor for accomplishing the above-stated purposes.

Another object is to provide a method which ensures that the means which grips the shaft is properly positioned; i.e., is close to being abutted with the rotor bearing at the rear of the motor.

SUMMARY OF THE INVENTION

In fulfillment of the above stated objects the present invention provides in the motor context described, means for insuring that end play is minimized. That is to say, although the distance between front and rear bearings for a given motor becomes indeterminate due to accumulated tolerance developed in the manufacturing process, a fixed predetermined value of end play can be established. This means takes the form of a special retainer disposed around the shaft of the rotor and moved, at the final stage of assembly of a particular motor, along the rotor shaft so as to come close to being abutted with the rear bearing for the rotor. In other words, the variale location of the rear bearing serves as a first reference point for positioning the retainer. Likewise, the variable location of the end point $(Y)$ of the casing serves as another, or second, reference point. Because of the way in which skeleton motors of the type discussed are fabricated, there is a substantially fixed distance, which varies only slightly (about ±0.003 inches) between this second reference point $(Y)$ and the first reference point $(X)$ (the rear bearing reference point).

Accordingly, although, as noted previously, the location of the rear bearing will vary from motor to motor, the location of the end point for the casing will vary in equal step with the rear bearing's location as the motor is being assembled. Therefore, when the aforenoted special retainer is moved along the motor shaft by a member of fixed dimension on an arbor press member, (referencing means), the spacing of the inner surface of the retainer ring from the assembled rear bearing is automatically determined by such fixed dimension. This spacing, which defines the desired uniform end play, corresponds to the difference between (1) the substantially fixed distance from said first reference point at the end of the assembled rear bearing to the second reference point at the end of the casing and (2) the sum of said fixed dimension and the thickness of said retainer ring.

Several embodiments are contemplated for this special retainer, the first embodiment including a ring which includes inwardly directed fingers which act to grip the shaft when the ring is pushed down on that shaft. Accordingly, the ring cannot easily be removed in the opposite direction once it is placed in the secure position. A washer is also included as part of this first embodiment.

A second version or embodiment of the retainer is likewise shaped in the form of a ring, but with a broader surface contact area than the first embodiment. Moreover, at the inner periphery there is formed an upstanding conical section having an inner diameter which fits tightly and continuously around the shaft, so as to insure that the retainer ring remains securely in the ultimate position eventually reached when it is forced downwardly on the shaft.

Another feature or aspect of the present invention resides in the method of precisely so positioning the retainer ring, whether it be in the form of the first embodiment or the second.

Other and further objects, advantages and features of the present invention will be understood by reference to the following specification in conjunction with the annexed drawing, wherein like parts have been given like numbers.

DESCRIPTION OF PREFERRED EMBODIMENT

Figure 1:
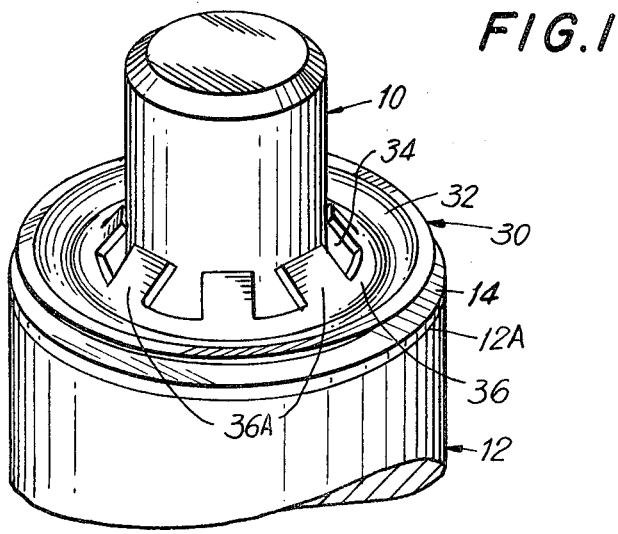
FIG. 1 is a fragmentary perspective view of a typical rotor shaft, a bearing means surrounding the shaft, and a retainer device of the present invention.

Referring now to the figures of the drawing, and in particular to FIG. 1, there is seen a typical motor assembly in fragmentary form, in which a shaft 10 of a rotor member is shown surrounded by a bronze bearing 12 that is part of the stator assembly 11. A full thrust surface contact area is provided by the upper surface 12A of the bearing and, seen on the figure above that point is a more or less conventional hardened washer 14, which makes contact with that bearing surface 12A.

In order to achieve the objects of the present invention a special retainer ring 30 formed in the configuration shown is provided with an annular concave portion 32, an opening 34 for receiving the shaft, and a convex portion 36. The portion 36 includes spaced fingers 36A projecting radially inwardly and upwardly so as to bear firmly against the shaft 10.

Figure 2:
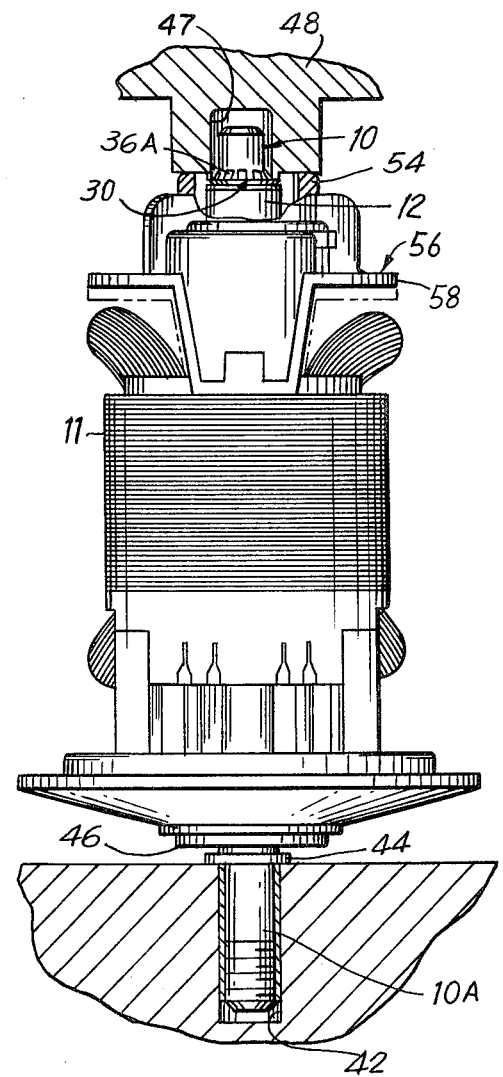
FIG. 2 is an elevation view, partly broken away, illustrating the arrangement for practicing the method of the present invention, in which a typical motor is seen having a retainer ring placed into position.
Figure 3:
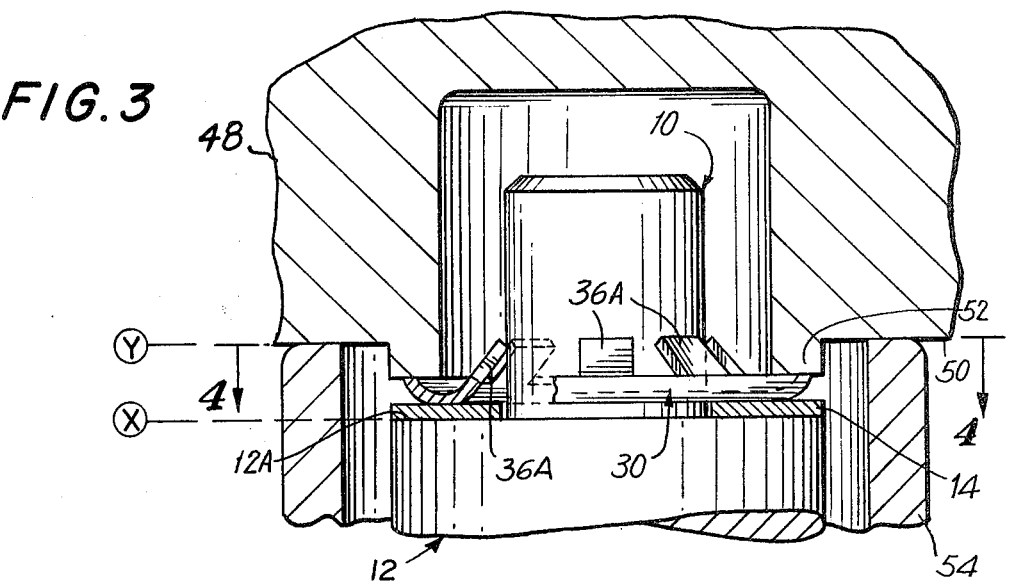
FIG. 3 is an enlarged elevation view illustrating the retainer device, in accordance with a first embodiment of the present invention, in relationship with the apparatus of FIG. 2.
Figure 4:
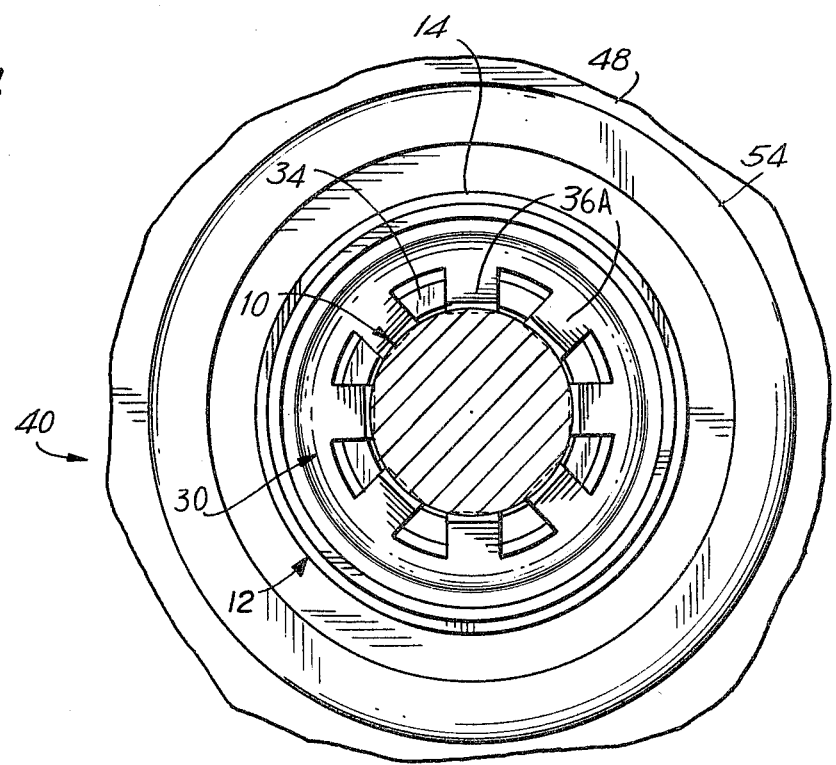
FIG. 4 is a sectional view taken on the line 4—4 of FIG. 3.

The method by which the retainer ring 30 is appropriately positioned on the shaft 10 may be understood by reference to FIGS. 2 and 3 in which there will be seen a motor 40 disposed in a vertical orientation such that the rotor shaft 10 has its front or lower end 10A nested in a recess 42. A locking member 44, located near the lower end of 10A of the shaft fits in a suitable groove in the shaft so as to serve as a reference point with respect to the front face 46 of the motor frame. Accordingly, with the locking member 44 in its fixed position on the shaft and arranged, as seen in FIG. 4, to span the opening into the recess 42, the shaft 10 moves relatively with respect to the frame of motor 40 whereby all of the play that exists in the shaft—as a consequence of all of the variations in the fabrication of an individual motor—is caused to protrude at the upper end. That is to say, the shaft extends at the rear of the motor into the upper recess 47 in the arbor press member or collar 48 in accordance with the degree of end play for that motor.

It will be seen that the arbor press member 48 is so configured that its lower end terminates in a substantially planar surface 50 except for a shoulder 52. This shoulder is so located that it abuts the periphery of the retainer ring 30, whereby it is effective in moving the retainer ring when the arbor press member is brought downwardly. Moreover the shoulder 52 is so dimensioned axially that it will move the retainer ring a predetermined distance beyond the plane of contact of the surface 50 with a ring 54, reference point and is located on, and forms an integral part of, the motor frame or casing. The upper surface of ring 54 serves as another, or second, reference point, such point being designated $Y$ in FIG. 3. As noted previously, the location of the rear bearing 12, or more precisely, the upper surface 12A thereof, serves as a first reference point, designated $X$ in FIG. 3.

In the particular embodiment illustrated (FIG. 2), the location of ring 54 is related to the location of rear bearing 12 by the end bracket 56 of which those two elements are integral parts. This end bracket includes an outwardly projecting fan ring 58. It will thus be understood that, although the location of the end bracket 56 varies in accordance with the aforenoted accumulated tolerances, the upper surface of ring 54 and the upper surface 12A of the rear bearing are always separate by a substantially fixed distance. Hence, the aforenoted predetermined distance corresponds with the desired location for the retainer ring such that it rests against or is appropriately close to the rear bearing 12.

It will be understood from the preceding description that, regardless of the total accumulated tolerances that may result in significant variation in the distance between the front and rear bearings, the retainer ring will always be precisely positioned. That is to say, no matter how this distance varies from motor to motor, the positioning of the retainer ring 30 will be so adjusted as to take these variations into account and the retainer ring 30 will always be pushed down to a precisely predetermined distance from the rear bearing, regardless of the variable amount of shaft extension that is present in the recess 46. Consequently there will always be the desired predetermined end play in the completed motor.

Figure 5:
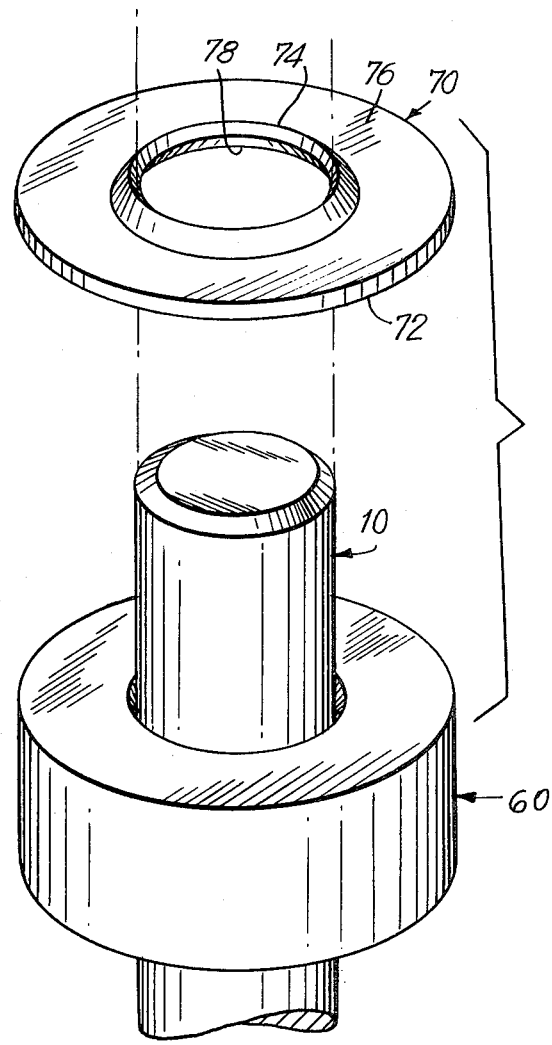
FIG. 5 is a perspective view illustrating the retainer configuration of a second embodiment in position close to a bearing surrounding a rotor shaft.
Figure 6:
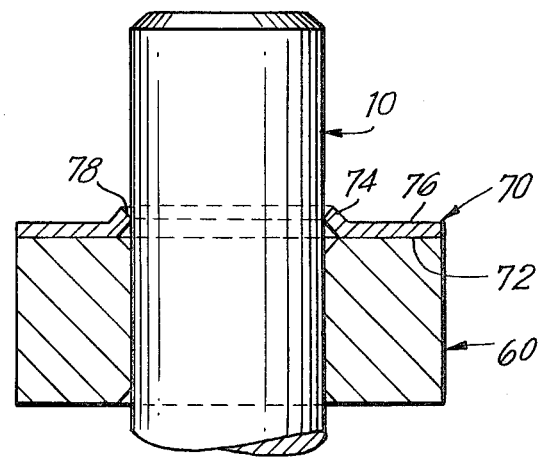
FIG. 6 is an elevational view, partly in section, of the assembly seen in FIG. 5.

Turning now to FIGS. 5 and 6, there is shown another embodiment of the principle of the present invention according to which a somewhat different retainer ring is provided. This particular retainer ring designated 70 has a broad surface area 72 precisely constructed to provide full thrust contact with the bearing 60 seen in FIG. 5. Thus a much greater area of contact with the bearing 60 is provided by the retainer ring alone, in contrast with the previous case of the retainer ring configuration of FIG. 1 where a hardened washer had to be used.

At the inner periphery of retainer ring 70 a frustoconical portion 74 is upstanding from the plane surface of annular portion 76 and defines an opening 78 for receiving shaft 10. The conical portion 74 is so constructed and dimensioned that a firm grip is established on shaft 10 when the retainer ring is pushed down, whereby it becomes virtually impossible to remove the ring. The retainer ring 70 is positioned as before, that is it is spaced precisely from the rear bearing by the technique explained already by reference to FIG. 2.

What has been disclosed is a technique and an arrangement useful in the manufacture of motors for precluding end play variations that would otherwise occur, due to accumulated tolerance. The technique adjusts for the indeterminate distance that results between front and rear bearings of a motor by selectively varying the position of a retainer ring in accordance with a variable reference point so as to establish a predetermined, substantially fixed, value for end play.

While there have been shown and described what are considered at present to be the preferred embodiments of the present invention, it will be appreciated by those skilled in the art that modifications of such embodiments may be made, it is therefore desired that the invention not be limited to these embodiments, and it is intended to cover in the appended claims all such modifications as fall within the true spirit and scope of the invention.

What is claimed is:

1. In a motor having a rotor shaft extending through a casing, such shaft carrying an armature, and in which the distance between the assembled front and rear bearings of the motor is affected by accumulated manufacturing tolerance such that said distance is indeterminate, being variable on the order of plus or minus 0.060 inches, the end of said assembled rear bearing constituting a variable, first reference point, the improvement comprising:
   (a) retaining means for insuring that a substantially fixed, minimum value for end play is automatically established despite said variability, said retaining means including a self-locking unitary retainer ring operative to grip the shaft in a location on the shaft axially outboard of the rear bearing;
   (b) means for referencing said retaining means to a variable second reference point at the end of said motor casing, the location of said reference point likewise varying in accordance with said variable accumulated tolerance for a given motor;
   (c) means on said referencing means, having a fixed dimension, for moving said retaining means along said rotor shaft, whereby the spacing of the inner surface of said retainer ring from said assembled rear bearing is automatically determined by such fixed dimension, said spacing corresponding to the difference between (1) the substantially fixed distance from said first reference point at the end of the assembled rear bearing to the second reference point at the end of the casing and (2) the sum of said fixed dimension and the thickness of said retainer ring.

2. In a motor as defined in claim 1, in which said retainer ring includes an annular portion at the outer periphery of said ring and a series of spaced portions directed radially inwardly and upwardly so as to grip said shaft and to retain said ring in a predetermined position.

3. In a motor as defined in claim 2, in which said means further includes a washer abutting both said retainer ring and the rear bearing of said motor.

4. In a motor as defined in claim 1, in which said retainer ring has a broad surface contact area to contact a surface of said rear bearing,
   said ring further including a conical upstanding portion to grip the rotor shaft.

* * * * *